United States Patent Office 2,900,296
Patented Aug. 18, 1959

2,900,296

NITROBENZOYLPHOSPHONATES

Joseph W. Baker and George A. Saul, Nitro, W. Va., assignors to Monsanto Chemical Company, St. Louis, Mo., a corporation of Delaware No Drawing. Application September 18, 1956
Serial No. 610,674

7 Claims. (Cl. 167—30)

This invention relates to new organic phosphorus compounds. More particularly it relates to O,O-dialkyl nitrobenzoylphosphonates and to nematocidal compositions containing them.

In accordance with this invention it has been found that certain nitrobenzoylphosphonates destroy nematodes and other pests. These compounds, believed to be new, may be represented by the general formula,

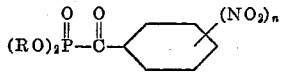

where R is a lower alkyl group, preferably methyl or ethyl, and $n$ is one or two. The position of the nitro groups influences toxicity to nematodes and optimum activity has been observed where the nitrobenzoyl group is para-nitrobenzoyl or 3,5-dinitrobenzoyl. These compounds may be obtained by condensing the corresponding nitrobenzoyl halide and a trialkyl phosphite with splitting out of alkyl halide. For the purpose of describing the invention and not as limitative thereof, the following examples are given:

EXAMPLE 1

To 33.2 parts by weight (0.2 mole) of triethyl phosphite was added slowly 46.1 parts by weight (0.2 mole) of 3,5-dinitrobenzoyl chloride, the temperature being controlled under 30° C. by means of external cooling. After all the chloride had been added, the reaction mixture was heated slowly to 100° C. and vacuum (100 mm.) applied. The temperature was then raised to 120° C. and the vacuum lowered to 10 mm. The yield of O,O-diethyl 3,5-dinitrobenzoylphosphonate, a viscous amber liquid, was essentially theoretical. Analysis gave 9.5% phosphorus as compared to 9.3% calculated for $C_{11}H_{13}N_2O_8P$.

EXAMPLE 2

To 44.7 parts by weight (0.27 mole) of triethyl phosphite, previously cooled to 0° C. by means of an ice-acetone bath, was added at 0–15° C. 50.0 parts by weight (0.27 mole) of p-nitrobenzoyl chloride. After the addition was completed the ice bath was removed and the temperature rose to 15° C. within 10 minutes. The reaction mixture was then heated at about 90° C. for one and one-half hours. The weight loss was 15.5 parts by weight (theory=17.5). The O,O-diethyl p-nitrobenzoylphosphonate, a viscous orange liquid, analyzed 9.0% phosphorus as compared to 10.8% calculated for $C_{11}H_{14}NO_6P$.

EXAMPLE 3

To 31.0 parts by weight (0.25 mole) of trimethyl phosphite in 130 ml. of benzene was added portionwise over a period of 20 minutes 46.4 parts by weight (0.25 mole) of p-nitrobenzoyl chloride. The temperature was raised slowly to 80° C. and the benzene distilled off. Product was then held at 120° C. for 25 minutes, vacuum being applied during the last 10 minutes. The yield of O,O-dimethyl p-nitrobenzoylphosphonate, a brown viscous product, was essentially theory. Analysis gave 11.8% phosphorus and 5.1% nitrogen as compared to 11.9% phosphorus and 5.4% nitrogen calculated for $C_9H_{10}NO_6P$.

To illustrate the nematocidal values of the new compounds a suspension of the nematode Panagrellus redivivus in water is prepared and the motility of the organism in the presence of 0.1% of the test material is observed through a microscope after exposure to the chemical. The motility after 24 hours exposure is recorded in the table. Evaluated in the same test, O,O-diethyl benzoylphosphonate is essentially inactive.

Table I

| Compound | Motility After 24 Hrs., percent |
|---|---|
| None | 100 |
| O,O-Diethyl 3,5-dinitrobenzoylphosphonate | 0 |
| O,O-Diethyl p-nitrobenzoylphosphonate | 0 |

In another test, heat sterilized soil is infested with nematodes (Meloidogyne sp.) and different portions treated with solutions containing concentrations of 0.1 and 0.01% by weight of O,O-diethyl p-nitrobenzoylphosphonate. After standing for a week, two-week old tomato plants are transplanted in the test soil and also in untreated, heat-sterilized soil. The plants are allowed to grow for two months, then harvested and the roots washed and examined. The results showed no nematode infestation.

In actual usage any of the compounds within the preferred class described may be added to the soil in solution, as an emulsion or water dispersion, or in a solid formulation wherein the active nematocide is distributed over some dry and permanently free-flowing powder such as the clays, including bentonite and attapulgite, or such materials as talc, diatomaceous earth, fullers earth, chalk, calcium carbonate and the like. These diluents normally comprise more than 50% up to 98% of the complete formulation and thereby provide a means of more even distribution of the active material over a wider area and in the effective quantities required. These nematocidal compositions will attack the soil phase of the life cycle of nematode parasites which infest animals. Treating barn yards, chicken pens, stables and other infested areas destroys eggs and also infective larvae of many parasites which infest animals. Moreover, the compositions are effective for the control of nematodes in their environment which includes bodies of animals.

In the use as nematocides or soil fumigants the active compound, diluted or undiluted, may be applied to the soil at rates of 10 to 500 pounds per acre. The preferred application for treating soils of average nematode infection will be from 25 to 100 pounds per acre. The formulation may contain dispersants which aid uniform distribution.

It is intended to cover all changes and modifications of the examples of the invention herein chosen for purposes of disclosure which do not constitute departures from the spirit and scope of the invention.

What is claimed is:

1. A nitrobenzoylphosphonate of the formula

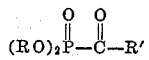

where R represents an alkyl group containing less than three carbon atoms and R' is selected from the group consisting of p-nitrophenyl and 3,5-dinitrophenyl.

2. A nitrobenzoylphosphonate of the formula

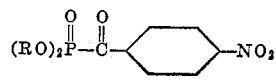

where R represents an alkyl group containing less than three carbon atoms.

3. A nitrobenzoylphosphonate of the formula

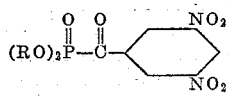

where R represents an alkyl group containing less than three carbon atoms.

4. As a new compound O,O-diethyl 3,5-dinitrobenzoylphosphonate.

5. As a new compound O,O-diethyl p-nitrobenzoylphosphonate.

6. A nematocidal composition comprising a major proportion of a carrier and a minor but effective concentration of a nitrobenzoylphosphonate of the formula

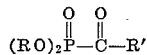

where R represents an alkyl group containing less than three carbon atoms and R' is selected from the group consisting of p-nitrophenyl and 3,5-dinitrophenyl.

7. The method of destroying parasitic worm life in agricultural soils which comprises contacting the said organisms with a nematocidal composition comprising an effective concentration of a compound having the structure

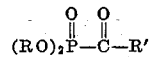

where R represents an alkyl group containing less than three carbon atoms and R' is selected from the group consisting of p-nitrophenyl and 3,5-dinitrophenyl.

References Cited in the file of this patent
UNITED STATES PATENTS

| | | |
|---|---|---|
| 2,516,168 | Woodstock | July 25, 1950 |
| 2,535,172 | Tawney | Dec. 26, 1950 |
| 2,750,324 | Bender | June 12, 1956 |
| 2,769,743 | Mattson | Nov. 6, 1956 |

OTHER REFERENCES

Kabachnik et al., "Bull. Acad. Sci. U.R.S.S., Classe Sci. Chim.," pp. 364–374 (1945) (in Russian). (Copy in Lib. of U.S. Dept. of Agriculture, Washington, D.C.) See also Chem. Abst., vol. 40, col. 4688–9, 1946.